(12) United States Patent     (10) Patent No.:   US 12,567,253 B2

Wu et al.            (45) Date of Patent:      Mar. 3, 2026

(54) EYE TRACKING, PHYSIOLOGY FOR SHARED SITUATIONAL AWARENESS

(71) Applicant: Rockwell Collins, Inc., Cedar Rapids, IA (US)

(72) Inventors: Peggy Wu, Ellicott City, MD (US); Andrew Radlbeck, South Glastonbury, CT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 384 days.

(21) Appl. No.: 18/216,299

(22) Filed: Jun. 29, 2023

(65) Prior Publication Data

US 2025/0005923 A1     Jan. 2, 2025

(51) Int. Cl.
     *G06V 20/40*       (2022.01)
     *G06V 40/18*       (2022.01)

(52) U.S. Cl.
     CPC .............. *G06V 20/40* (2022.01); *G06V 40/18* (2022.01)

(58) Field of Classification Search
None
See application file for complete search history.

(56) References Cited

U.S. PATENT DOCUMENTS

| | | | |
|---|---|---|---|
| 2003/0190940 A1* | 10/2003 | Gordon | ................... A63F 13/52 |
| | | | 463/9 |
| 2017/0212771 A1* | 7/2017 | Weissberg | ............... G06F 9/452 |

| | | | |
|---|---|---|---|
| 2020/0298100 A1* | 9/2020 | Ambinder | .......... A61N 1/36025 |
| 2021/0165490 A1 | 6/2021 | Aimone et al. | |
| 2021/0326586 A1* | 10/2021 | Sorci | ...................... G16H 15/00 |
| 2022/0095975 A1 | 3/2022 | Aluf et al. | |

FOREIGN PATENT DOCUMENTS

| | | |
|---|---|---|
| JP | 2009508553 A | 3/2009 |
| WO | 2018232538 A1 | 12/2018 |

OTHER PUBLICATIONS

European Search Report received in EP Application No. 24185804. 2, Nov. 13, 2024, 8 pages.

* cited by examiner

*Primary Examiner* — Jason T Yen

(74) *Attorney, Agent, or Firm* — Suiter Swantz IP

(57) ABSTRACT

A team monitoring system receives data for determining user situational awareness and/or surprise for each team member. A team metric of situational awareness and/or surprise is determined for the entire team based on individual user situational awareness and/or surprise correlated to discreet portions of a task. User situational awareness and/or surprise may be determined based on arm/hand positions, gaze, and pupil dynamics with respect to a baseline measurement. Individual user situational awareness and/or surprise is weighted according to a task priority for that individual user at the time. The system determines a team composition based on individual user situational awareness and/or surprise during a task and team situational awareness and/or surprise during the task; even where the users have not engaged as a team during the task.

17 Claims, 3 Drawing Sheets

EYE TRACKING, PHYSIOLOGY FOR SHARED SITUATIONAL AWARENESS

GOVERNMENT LICENSE RIGHTS

The U.S. Government has a paid-up license in this invention and the right in limited circumstances to require the patent owner to license others on reasonable terms as provided by the terms of DE-AR0001097 awarded by The United States Department of Energy.

BACKGROUND

When working with remote human teams such as pilots and ground control, or trainees and instructors, either for collaboration or training, it can be difficult to assess the group's common shared situation awareness because of a lack of social cues. Even with video conferencing, team members may only be able to see each other's faces but not their actions with respect to their own instrument panels.

SUMMARY

In one aspect, embodiments of the inventive concepts disclosed herein are directed to a team monitoring system that receives data for determining user situational awareness and/or surprise for each team member. A team metric of situational awareness and/or surprise is determined for the entire team based on individual user situational awareness and/or surprise correlated to discreet portions of a task. User situational awareness and/or surprise may be determined based on arm/hand positions, gaze, and pupil dynamics with respect to a baseline measurement.

In a further aspect, individual user situational awareness and/or surprise is weighted according to a task priority for that individual user at the time.

In a further aspect, the system determines a team composition based on individual user situational awareness and/or surprise during a task and team situational awareness and/or surprise during the task; even where the users have not engaged as a team during the task.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
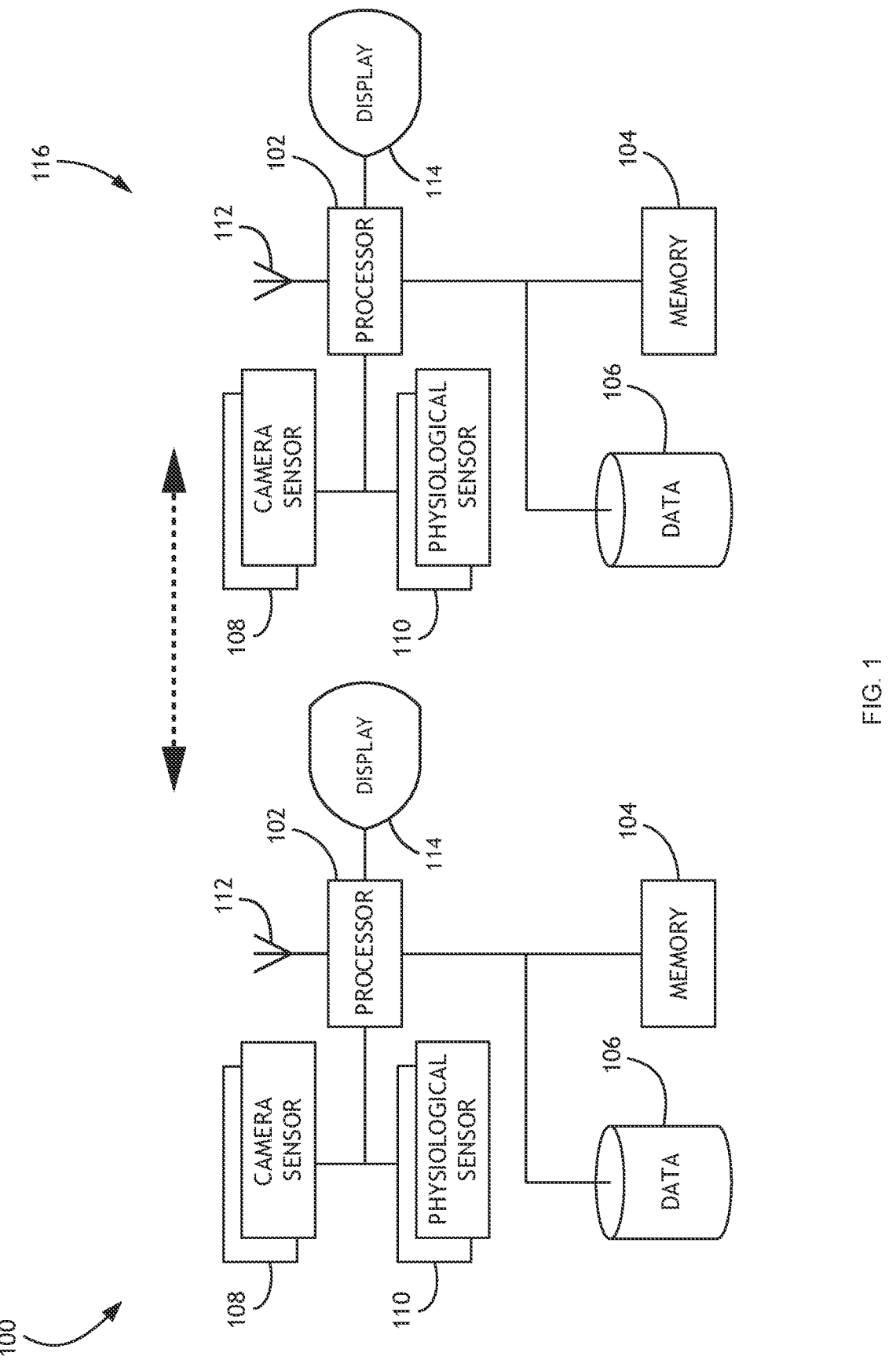
FIG. 1 shows a block diagram of a system suitable for implementing embodiments of the incentive concepts disclosed herein.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a team monitoring system that receives data for determining user situational awareness and/or surprise for each team member. A team metric of situational awareness and/or surprise is determined for the entire team based on individual user situational awareness and/or surprise correlated to discreet portions of a task. User situational awareness and/or surprise may be determined based on arm/hand positions, gaze, and pupil dynamics with respect to a baseline measurement. Individual user situational awareness and/or surprise is weighted according to a task priority for that individual user at the time. The system determines a team composition based on individual user situational awareness and/or surprise during a task and team situational awareness and/or surprise during the task; even where the users have not engaged as a team during the task.

Referring to FIG. 1, a block diagram of a system suitable for implementing embodiments of the incentive concepts disclosed herein is shown. The system includes at least two nodes 100, 116, each including a processor 102, memory 104 in data communication with the processor 102 for storing processor executable code, one or more cameras 108 for receiving a video data stream, and one or more physiological sensors 110. Physiological sensors 110 may include devices such as an electroencephalograph (EEG), functional near-infrared spectroscopy (fNIRs), heart rate monitor, galvanic skin response sensor or any other such biometric data sensing device.

In at least one embodiment, the one or more cameras 108 record eye movement/gaze of a user, eye lid position, hand/arm position and movement, and other physical data landmarks. The processor executable code configures the processor 102 to continuously log the camera data in a data storage element 106. The processor 102 analyzes the camera data to identify gaze and pupil dynamics (e.g., pupil response and changes over time), and physical pose estimate for the user. Each processor 102 may also receive physiological data from one or more corresponding physiological sensors 110.

In at least one embodiment, the processor 102 may correlate camera data (including at least gaze and pupil dynamics) with physiological data. The processor 102 may compare the camera and physiological data to stored individual profiles, specific to the user. The profiles define individual base line measurements of physiological metrics, gaze, and pupil dynamics; comparing instantaneous measurements to the individual baseline measurements may provide a metric of situational awareness and/or surprise. The processor 102 may display the metric of situational awareness and/or surprise on a display device 114.

The system operates across multiple nodes 100, 116, with each node 100, 116 directed toward an individual team member. Each node 100, 116 may be configured to receive metrics of situational awareness and/or surprise for each other connected team member via a data communication device 112. In at least one embodiment, each node 100, 116 may correlate metrics of situational awareness and/or surprise for each team member, within the context of discreet portions of a task being performed by the team. Each processor 102 may then determine a team metric of situational awareness and/or surprise for each discreet portion of the task. Alternatively, or in addition, a centralized computer system may receive metrics of situational awareness and/or surprise for each team member and independently perform the correlations and team metric computation.

In at least one embodiment, the camera data are correlated with discreet portions of a task, and/or specific stimuli such as instrument readings, alerts, or the like. Furthermore, the processors 102 from each node 100, 116 correlate camera data from different users engaged in a common or collective task. Each processor 102 may receive different discreet portions of a task, specific stimuli, and alerts based on the specific function of the user; such different discreet portions, stimuli, and alerts are correlated in time such that user responses may be individually analyzed and correlated to each other to assess total team situational awareness and/or surprise. In at least one embodiment, team situational awareness and/or surprise may be weighted according to a priority of team members in time. For example, a first node 100 may analyze the situational awareness and/or surprise of a first team member performing a critical portion of the task while a second node 116 analyzes the situational awareness and/or surprise of a second team member simultaneously performing a less critical portion of the task. The assessment of total team situational awareness and/or surprise may be weighted toward the situational awareness and/or surprise of the first team member.

In at least one embodiment, total team situational awareness and/or surprise may be at least partially based on lag between team members. Each processor 102 may identify a delay between team member actions and determine if the delay exceeds some threshold. For example, the situational awareness and/or surprise of the first team member may be partially based on the first team member's response to the actions of the second team member as communicated to the first node processor 102 by the second node processor 102 via corresponding data communication devices 112.

In at least one embodiment, each node 100, 116 may share camera data between nodes 100, 116 via the data communication device 112 to render on a corresponding display 114. The first team members situational awareness and/or surprise may be characterized with respect to the second team members camera data (facial expression, gaze, pupil dynamics, etc.). Furthermore, the second node 116 may provide a real-time situational awareness and/or surprise assessment of the second team member to other team members; the situational awareness and/or surprise of the first team member may be at least partially characterized with respect to the situational awareness and/or surprise assessment of the second team member. For example, the first node may identify a gaze of the first team member and determine that the first team member is observing the second team member; the second team members situational awareness and/or surprise may be associated with a predicted or characteristic response of the first team member. The situational awareness and/or surprise of the first team member may be assessed with respect to the speed and appropriateness of their response to the second team member, including interacting with the second team member or assuming some of their functions.

In at least one embodiment, the processor 102 transfers the stored camera data and other correlated system and task data to an offline storage device for later analysis and correlation to historic data and other outside factors such as crew rest, crew sleet rhythms, flight schedules, etc. Such transfer may be in real time via the wireless communication device 112. Furthermore, team members may be correlated against each other and other team members for similar tasks to identify teams with complimentary situational awareness and/or surprise patterns. For example, offline analysis may identify a team wherein no team members consistently demonstrate reduced situational awareness and/or surprise at the same time during similar tasks.

In at least one embodiment, each processor 102 may characterize each task or each discreet portion of the task according to certain predefined, general categories. The processor 102 may determine metrics of situational awareness and/or surprise for multiple tasks of portions of a task, and determine a corresponding metric for the predefined, general categories such that the processor 102 may predict a response of the user to similarly categorized tasks even when the user has never performed those tasks. For example, certain tasks may necessitate fast observation of multiple instruments while other tasks may necessitate a high degree of concentration to a single instrument. The processor 102 may determine a metric indicating the user has better situational awareness when observing multiple instruments and apply that metric prospectively to other tasks.

When determining a team metric of situational awareness and/or surprise, the processor 102 may determine such metric with respect to a specific task. The processor 102 may identify categories associated with the specific task and apply category specific user metrics of situational awareness and/or surprise when determining the team metric, even when the team has not performed the specific task before.

Figure 2:
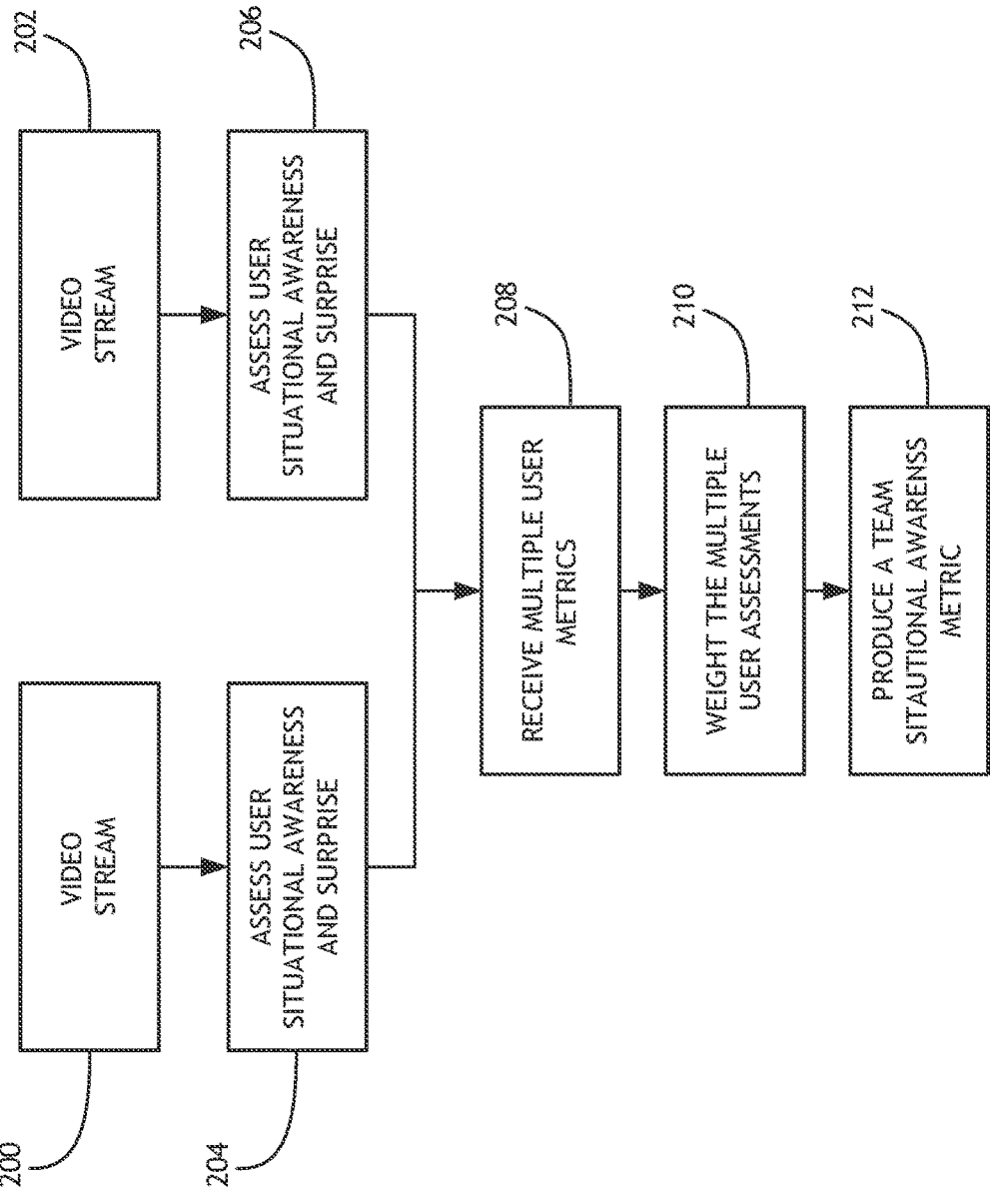
FIG. 2 shows a flowchart of an exemplary embodiment of the inventive concepts disclosed herein.

Referring to FIG. 2, a flowchart of an exemplary embodiment of the inventive concepts disclosed herein is shown. Computer systems implementing embodiments of the inventive concepts disclosed herein each receive 200, 202 a video stream corresponding to one or more cameras. The video stream is processed for eye tracking data (including pupil dynamics and eyelid position) and to determine physiological landmarks such as hands and arms to generate a pose estimate for the user. Such data is continuously logged and used to assess 204, 206 user situational awareness and/or surprise. For example, each computer system may compare eye gaze to predetermined expected eye gaze or scan patterns depending on a current task. Furthermore, the computer system may identify surprise from pupil dynamics and eyelid position as defined by an algorithmic model or machine learning algorithm.

In at least one embodiment, each computer system (or some separate computer system) receives 208 each user metric of situational awareness and/or surprise, and potentially each video stream. Based on video streams and the multiple user metrics of situational awareness and/or surprises, the computer system produces 212 a team metric of situational awareness and/or surprise. The team metric of situational awareness and/or surprise may be an average, some identified minimum, or the like. In at least one embodiment, the team metric of situational awareness and/or or surprise may be weighted 210 by the associated team member. For example, the computer system may define or receive a priority associated with the task of each team member and weight the corresponding metric of situational awareness and/or surprise by the associated priority.

In at least one embodiment, the system receives physiological data from one or more physiological sensors such as an EEG, an fNIRs, a heart rate monitor, galvanic skin response, etc. Such physiological data provides the addition metric of neuroactivity when assessing 204, 206 user situational awareness and/or surprise. Likewise, the system may receive data related to factors specific to the task. Such task specific data provides the additional metric of context when assessing 204, 206 user situational awareness and/or surprise. Such analysis may include processing via machine learning, neural network algorithms. Tasks may define specific future actions or future action potentialities from which to make a weighted situational awareness and/or surprise assessment.

In at least one embodiment, the system may compile data to facilitate the implementation of one or more of the future actions without the intervention of the user, and potentially before the user has made a determination of what future actions will be performed. The system may prioritize data compilation based on the determined probability of each future action.

Figure 3:
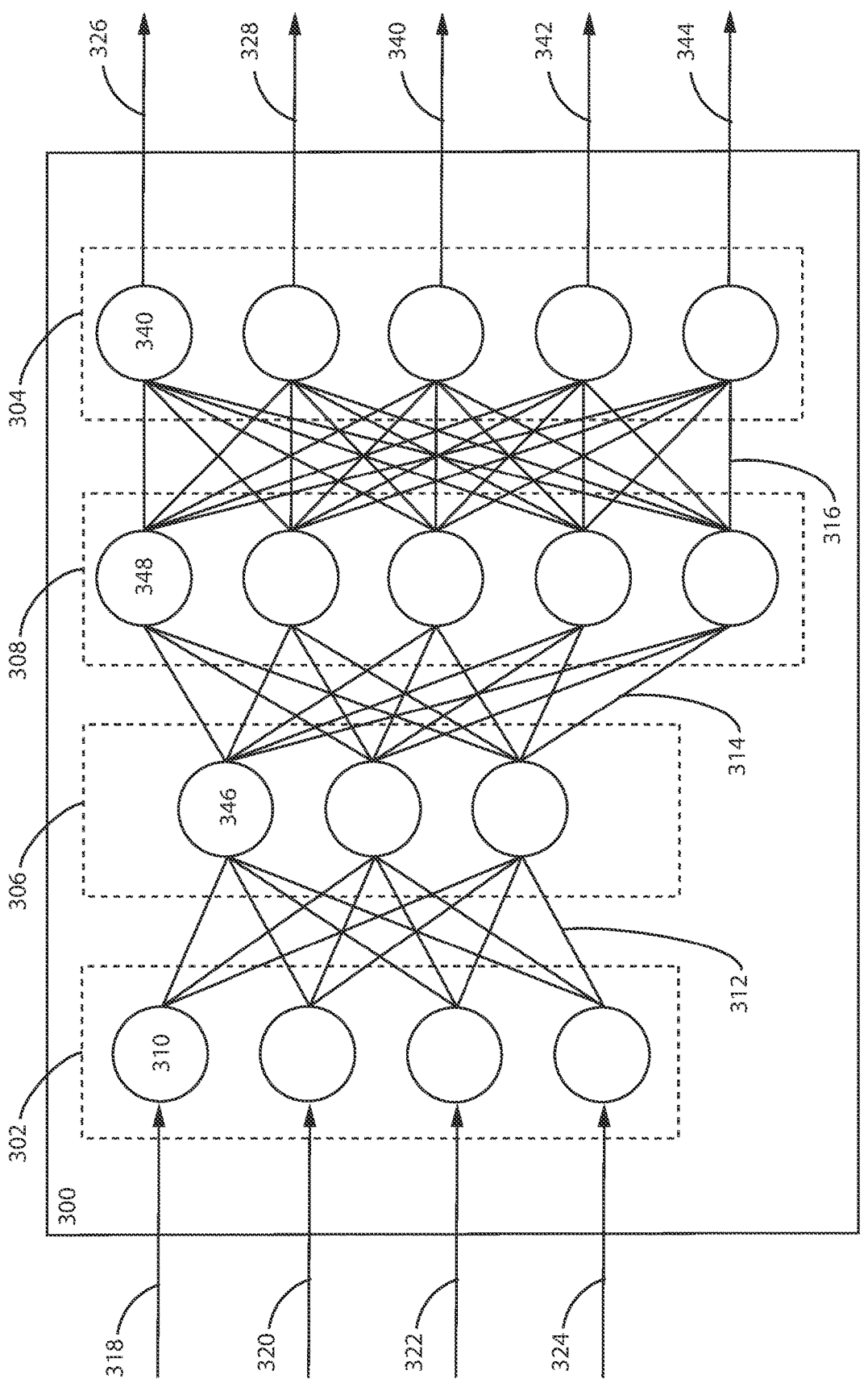
FIG. 3 shows a block diagram of a neural network according an exemplary embodiment of the inventive concepts disclosed herein.

Referring to FIG. 3, a block diagram of a neural network 300 according an exemplary embodiment of the inventive concepts disclosed herein is shown. The neural network 300 comprises an input layer 302 that receives external inputs (including physiological signals, such as EEG, fNIRs, heart rate monitor, galvanic skin response, etc., camera data, and potentially user or task specific profiles), and output layer 304, and a plurality of internal layers 306, 308. Each layer comprises a plurality of neurons or nodes 310, 336, 338, 340. In the input layer 302, each node 310 receives one or more inputs 318, 320, 322, 324 corresponding to a digital signal and produces an output 312 based on an activation function unique to each node 310 in the input layer 302. An activation function may be a Hyperbolic tangent function, a linear output function, and/or a logistic function, or some combination thereof, and different nodes 310, 336, 338, 340 may utilize different types of activation functions. In at least one embodiment, such activation function comprises the sum of each input multiplied by a synaptic weight. The output 312 may comprise a real value with a defined range or a Boolean value if the activation function surpasses a defined threshold. Such ranges and thresholds may be defined during a training process. Furthermore, the synaptic weights are determined during the training process.

Outputs 312 from each of the nodes 310 in the input layer 302 are passed to each node 336 in a first intermediate layer 306. The process continues through any number of intermediate layers 306, 308 with each intermediate layer node 336, 338 having a unique set of synaptic weights corresponding to each input 312, 314 from the previous intermediate layer 306, 308. It is envisioned that certain intermediate layer nodes 336, 338 may produce a real value with a range while other intermediated layer nodes 336, 338 may produce a Boolean value. Furthermore, it is envisioned that certain intermediate layer nodes 336, 338 may utilize a weighted input summation methodology while others utilize a weighted input product methodology. It is further envisioned that synaptic weight may correspond to bit shifting of the corresponding inputs 312, 314, 316.

An output layer 304 including one or more output nodes 340 receives the outputs 316 from each of the nodes 338 in the previous intermediate layer 308. Each output node 340 produces a final output 326, 328, 330, 332, 334 via processing the previous layer inputs 316, the final output 326, 328, 330, 332, 334 corresponding to an metric of situational awareness and/or surprise for one or more team members. Such outputs may comprise separate components of an interleaved input signal, bits for delivery to a register, or other digital output based on an input signal and DSP algorithm. In at least one embodiment, multiple nodes may each instantiate a separate neural network 300 to process a metric of situational awareness and/or surprise for a single corresponding team member. Furthermore, the metric of situational awareness and/or surprise may be associated in the output 326, 328, 330, 332, 334 with one or more predefined, general categories of tasks. Each neural network 300 may receive data from other team members as inputs 318, 320, 322, 324. Alternatively, a single neural network 300 may receive inputs 318, 320, 322, 324 from all team members, or a separate neural network 300 may receive inputs 318, 320, 322, 324 from each team member's neural network 300 to determine a team metric of situational awareness and/or surprise.

In at least one embodiment, each node 310, 336, 338, 340 in any layer 302, 306, 308, 304 may include a node weight to boost the output value of that node 310, 336, 338, 340 independent of the weighting applied to the output of that node 310, 336, 338, 340 in subsequent layers 304, 306, 308. It may be appreciated that certain synaptic weights may be zero to effectively isolate a node 310, 336, 338, 340 from an input 312, 314, 316, from one or more nodes 310, 336, 338 in a previous layer, or an initial input 318, 320, 322, 324.

In at least one embodiment, the number of processing layers 302, 304, 306, 308 may be constrained at a design phase based on a desired data throughput rate. Furthermore, multiple processors and multiple processing threads may facilitate simultaneous calculations of nodes 310, 336, 338, 340 within each processing layers 302, 304, 306, 308.

Layers 302, 304, 306, 308 may be organized in a feed forward architecture where nodes 310, 336, 338, 340 only receive inputs from the previous layer 302, 304, 306 and deliver outputs only to the immediately subsequent layer 304, 306, 308, or a recurrent architecture, or some combination thereof.

Embodiments of the inventive concepts disclosed herein are critical to enabling reduced crew operations. An autonomous system can use detections of team situational awareness and/or surprise to estimate when to provide appropriate information to the users for an adaptive user interface scenario.

The ability to understand how remote team members are working together and gauge whether teammates have shared situation awareness is important for assessing team performance. This can influence team formation and resource allocation, as well as help identify when interventions may be needed to help specific team members.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one camera;
a data communication device; and
at least one processor in data communication with a memory storing processor executable code; and
wherein the processor executable code configures the at least one processor to:
receive a video stream from the at least one camera;
receive a predefined baseline user measurement of at least gaze and pupil dynamics;
determine a user metric of situational awareness and/or surprise based on the video stream compared to the predefined baseline;
receive one or more contemporaneous team member metrics of situational awareness and/or surprises via the data communication device;
determine a priority associated with each of the user metric of situational awareness and/or surprise and one or more contemporaneous team member metric of situational awareness and/or surprises;
weight the user metric of situational awareness and/or surprise and one or more contemporaneous team member metric of situational awareness and/or surprises according to the associated priority; and
determine a team metric of situational awareness and/or surprise based on the weighted user metric of situational awareness and/or surprise and one or more weighted contemporaneous team member metric of situational awareness and/or surprises.

2. The computer apparatus of claim 1, further comprising one or more physiological data recording devices in data communication with the at least one processor, wherein:
the processor executable code further configures the at least one processor to:
receive physiological data from the one or more physiological data recording devices; and
correlate the physiological data with the video stream; and
creating the user metric of situational awareness and/or surprise includes reference to the physiological data.

3. The computer apparatus of claim 2, wherein:
the processor executable code further configures the at least one processor to receive a task or user specific profile of gaze, scan pattern, voice intonation, and physiological data; and
creating the user metric of situational awareness and/or surprise includes reference to the task or user specific profile.

4. The computer apparatus of claim 1, further comprising a display, wherein the processor executable code further configures the at least one processor to:
receive at least one video stream from a team member via the data communication device;
display the at least one video stream from the team member on the display; and
determine the user engagement with reference to the at least one video stream from the team member.

5. The computer apparatus of claim 1, wherein the processor executable code further configures the at least one processor as a machine learning neural network.

6. A method comprising:
receiving a video stream from at least one camera;
receiving a predefined baseline user measurement of at least gaze and pupil dynamics;
determining a user metric of situational awareness and/or surprise based on the video stream compared to the predefined baseline;
receiving one or more contemporaneous team member metrics of situational awareness and/or surprises via a data link;
determining a priority associated with each of the user metric of situational awareness and/or surprise and one or more contemporaneous team member metric of situational awareness and/or surprises;
weighting the user metric of situational awareness and/or surprise and one or more contemporaneous team member metric of situational awareness and/or surprises according to the associated priority; and
determining a team metric of situational awareness and/or surprise based on the weighted user metric of situational awareness and/or surprise and one or more weighted contemporaneous team member metric of situational awareness and/or surprises.

7. The method of claim 6, further comprising:
receiving physiological data from one or more physiological data recording devices; and
correlating the physiological data with the video stream, wherein creating the user metric of situational awareness and/or surprise includes reference to the physiological data.

8. The method of claim 7, further comprising receiving a task or user specific profile of gaze, scan pattern, voice intonation, and physiological data, wherein creating the user metric of situational awareness and/or surprise includes reference to the task or user specific profile.

9. The method of claim 6, further comprising:
receiving at least one video stream from a team member;
displaying the at least one video stream from the team member on a display; and
determining the user engagement with reference to the at least one video stream from the team member.

10. The method of claim 6, further comprising recording the team metric of situational awareness and/or surprise, user metric of situational awareness and/or surprise, and one or more contemporaneous team member metric of situational awareness and/or surprises associated with each of a plurality of discreet tasks over time.

11. The method of claim 10, further comprising determining a team composition based on the team metric of situational awareness and/or surprise, user metric of situational awareness and/or surprise, and one or more contemporaneous team member metric of situational awareness and/or surprises based on individual engagement during discreet tasks.

12. A team monitoring system comprising:
a plurality of team member monitoring computers, each comprising:
at least one camera;
a data communication device; and
at least one processor in data communication with a memory storing processor executable code to configure the at least one processor to:
receive an video stream from the at least one camera;
receive a predefined baseline user measurement of at least gaze and pupil dynamics;
determine a user metric of situational awareness and/or surprise based on the video stream compared to the predefined baseline;
receive one or more contemporaneous team member metrics of situational awareness and/or surprises from the plurality of team member monitoring computers via the data communication device;
determine a priority associated with each of the user metric of situational awareness and/or surprise and one or more contemporaneous team member metric of situational awareness and/or surprises;
weight the user metric of situational awareness and/or surprise and one or more contemporaneous team member metric of situational awareness and/or surprises according to the associated priority; and
determine a team metric of situational awareness and/or surprise based on the weighted user metric of situational awareness and/or surprise and one or more weighted contemporaneous team member metric of situational awareness and/or surprises.

13. The team monitoring system of claim 12, further comprising one or more physiological data recording devices in data communication with the at least one processor, wherein:
the processor executable code further configures the at least one processor to:
receive physiological data from the one or more physiological data recording devices; and
correlate the physiological data with the video stream; and
creating the user metric of situational awareness and/or surprise includes reference to the physiological data.

14. The team monitoring system of claim 13, wherein:
the processor executable code further configures the at least one processor to receive a task or user specific profile of gaze, scan pattern, voice intonation, and physiological data; and
creating the user metric of situational awareness and/or surprise includes reference to the task or user specific profile.

15. The team monitoring system of claim 12, further comprising a display, wherein the processor executable code further configures the at least one processor to:
receive at least one video stream from a team member via the data communication device;
display the at least one video stream from the team member on the display; and
determine the user engagement with reference to the at least one video stream from the team member.

16. The team monitoring system of claim 12, wherein the processor executable code further configures the at least one processor as a machine learning neural network.

17. The team monitoring system of claim 12, wherein the processor executable code further configures the at least one processor to:
record the team metric of situational awareness and/or surprise, user metric of situational awareness and/or surprise, and one or more contemporaneous team member metric of situational awareness and/or surprises associated with each of a plurality of discreet tasks over time; and
determine a team composition based on the team metric of situational awareness and/or surprise, user metric of situational awareness and/or surprise, and one or more contemporaneous team member metric of situational awareness and/or surprises based on individual engagement during discreet tasks.

* * * * *